United States Patent
Benayoun et al.

(10) Patent No.: US 6,806,866 B2
(45) Date of Patent: Oct. 19, 2004

(54) SYSTEM AND METHOD FOR ESTABLISHING WIRELESS CONNECTION

(75) Inventors: Alain Benayoun, Cagnes-sur-Mer (FR); Patrick Michel, La Gaude (FR); Gilles Toubol, Villeneuve Loubet (FR)

(73) Assignee: International Business Machines Corporation, Armonk, NY (US)

( * ) Notice: Subject to any disclaimer, the term of this patent is extended or adjusted under 35 U.S.C. 154(b) by 314 days.

(21) Appl. No.: 09/894,166

(22) Filed: Jun. 27, 2001

(65) Prior Publication Data

US 2002/0044131 A1 Apr. 18, 2002

(30) Foreign Application Priority Data

Jul. 13, 2000 (EP) ............................................ 00480061

(51) Int. Cl.$^7$ ................................................. G09G 5/08
(52) U.S. Cl. ........................................ 345/163; 345/156
(58) Field of Search ................................. 345/156, 157, 345/158, 163, 169, 173, 717, 718; 370/535, 338

(56) References Cited

U.S. PATENT DOCUMENTS

| | | | |
|---|---|---|---|
| 5,943,042 A | * 8/1999 | Siio | ............................ 345/172 |
| 6,072,468 A | 6/2000 | Hocker et al. | |
| 6,378,014 B1 | * 4/2002 | Shirley | ........................ 710/100 |
| 6,469,690 B1 | * 10/2002 | Abraham et al. | ............ 345/156 |
| 6,549,966 B1 | * 4/2003 | Dickens et al. | ............. 710/300 |
| 6,664,949 B1 | * 12/2003 | Amro et al. | ................. 345/168 |
| 6,671,756 B1 | * 12/2003 | Thomas et al. | ................ 710/73 |

FOREIGN PATENT DOCUMENTS

JP        11272409        8/1999

OTHER PUBLICATIONS

Tawabata Yuko, Japan Pub. No. 10–116151*
"Memory Mouse," *IBM Technical Disclosure Bulletin*, vol. 37, No. 7, Jul. 1994, p. 1.

* cited by examiner

Primary Examiner—Regina Liang
Assistant Examiner—Jennifer T. Nguyen
(74) Attorney, Agent, or Firm—Scott W. Reid; Dillon & Yudell, LLP (57) ABSTRACT

A system for establishing wireless connection between a peripheral device and an intelligent device in a multi-computer environment having a plurality of intelligent devices is disclosed. The system is in part included within the peripheral device which is preferably a mouse device and also is included within the intelligent device which is preferably a computer system. Specific routines of the system allow a user to work with any of the intelligent devices using only the one mouse device.

20 Claims, 10 Drawing Sheets

SYSTEM AND METHOD FOR ESTABLISHING WIRELESS CONNECTION

The application claims the priority of European Application Patent No. 00480061.1, filed on 13 Jul. 2000, and entitled "System and Method for Establishing Wireless Connection."

BACKGROUND OF THE INVENTION

1. Technical Field

The present invention relates in general to wireless data communication between different computer devices, and in particular to a method and apparatus for automatically establishing a wireless connection between a peripheral device and a computer device.

2. Description of the Related Art

These days it is more and more common to have one user working with several computer systems in his office. With the current technology, each computer system uses its own peripheral device to control cursor displacement on the computer display screen, such as a cabled or a wireless mouse device. The major drawback is that the user has to use a different peripheral device each time he works with a different computer system which is not convenient and could lead to fastidious manipulation.

Another problem arising from the use of different peripheral devices is the software support required for these peripheral devices. In fact, currently each manufacturer of peripheral devices such as International Business Machines Corp. provides the peripheral device, along with a diskette including a device driver program which is to be installed on the computer system by the user. Thus, there is a need for a unique peripheral device that may be used with any number of computer systems the user works with.

The present invention offers a method to automatically install a device driver program of the peripheral device without the need of such a diskette.

Finally, the present invention is directed towards a user friendly system and method which offers to the user an easy way to establish a wireless link between a peripheral device and a selected computer system among a plurality of computer systems.

SUMMARY OF THE INVENTION

In accordance with the invention, there is provided a peripheral device for establishing wireless connection with an intelligent device. The peripheral device comprises logic for controlling a cursor displacement on a display screen of the intelligent device, and further comprises:

(1) logic coupled to the controlling logic for generating a plurality of identification signals, where the identification signals comprise at least a device driver signal identifying the device driver associated to the peripheral device, and (2) logic coupled to the controlling logic for analyzing at least one acknowledgment signal received from the intelligent device in response to the plurality of identification signals.

Preferably, a first actuation means, such as a push button, located on the cover of the peripheral device are actuated by a user during the generation of the plurality of identification signals. Similarly, second actuation means, such as a predetermined key of a keyboard connected to the intelligent device, are also actuated by the user during the generation of the plurality of the identification signals.

In the preferred implementation, the identification signals and the acknowledgment signals are HDLC frames having a specific control field for defining the kind of frame, i.e., if the frame is transmitted from the peripheral device or from the intelligent device, if the frame is a synchronization one or a desynchronization one or a frame which contains the device driver to be download to the intelligent device.

Also in accordance with the present invention, a system for establishing wireless connection between a peripheral device and an intelligent device in a multi-computers environment having a plurality of intelligent devices, is provided. The system is in part included within the peripheral device, which is preferably a mouse device, and also is included within the intelligent device, which is preferably a computer system. Specific routines of the system allow a user to work with any of the intelligent devices using only the one mouse device.

DETAILED DESCRIPTION OF THE PREFERRED EMBODIMENT

Figure 1:
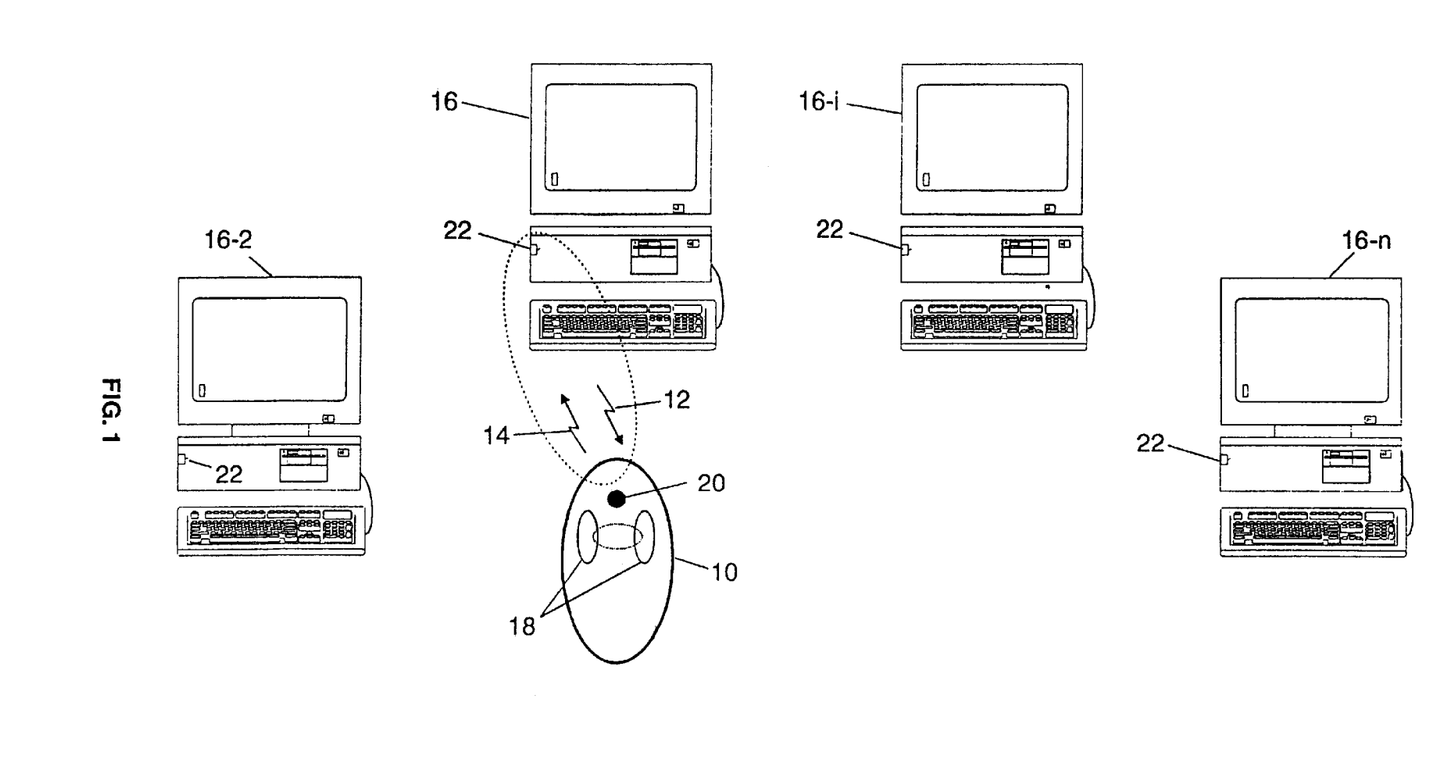
FIG. 1 depicts a multi-computer environment wherein the cableless peripheral device of the invention may link to anyone of the computers.

FIG. 1 shows a general block diagram of a preferred infrared mouse environment of the invention. Generally stated, the present invention comprises a convenient technique for allowing a peripheral device to be connected through a wireless communication to a selected device among a plurality of intelligent devices in a dense computing environment. The selected intelligent device could be a stationary device or a mobile computing device. In the detailed embodiments presented below, the peripheral device is assumed to comprise a data mouse. However, those skilled in the art should recognize that the concepts presented herein are equally applicable to other types of peripheral data storage or computing devices. On FIG. 1, a mouse device 10 is wirelessly coupled, e.g., using infrared waves 12 and 14, to a selected computer system 16 among a plurality of neighbored computer systems (16-2 to 16-n). Computer system 16 is equipped with graphical user interface software, such as that supported by the IBM OS/2 operating system of International Business Machines Corp. Use of infrared waves 12 and 14 allows greater freedom of placement of device 10 compared with a hardwired connection of the devices. Other wireless communication techniques could also be employed. For example, a wireless optical communication link or electromagnetic wave may be used if desired. A preferred mouse configuration is shown with two "clicker" buttons 18, a "push" button 20, and a mouse ball assembly (not shown). Computer system 16 has a display screen, a keyboard, and additional hardware 22 to communicate with mouse device 10. As explained briefly above, a significant advantage of the present invention is the ability to establish a wireless connection between a mouse device and a selected computing system in a dense computing environment having a plurality of computing systems (16-2 to 16-n) in close proximity to one another. Each computer system (16, 16-2 to 16-n) comprises specific features 22 made of hardware circuitry and software programs, which allow, in accordance with the present invention, the automatic establishment of wireless connection between mouse device 10 and one of the multiple computer systems.

Figure 2:
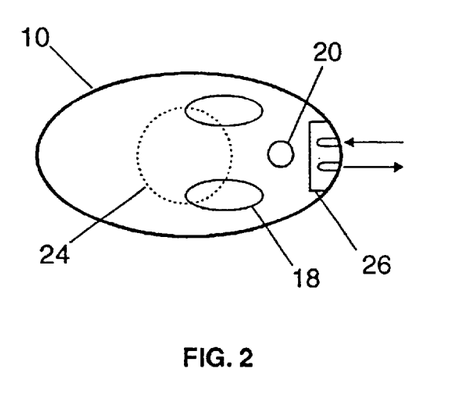
FIG. 2 is a top view of the mechanical part of a cableless mouse for use in accordance with the present invention.

FIG. 2 shows a mechanical view of one preferred embodiment of a mouse device 10 in accordance with the present invention. The mouse device 10 has a built-in means for controlling the pointer on a graphical user interface equipped computing device. Although the present invention is described herein in connection with a mouse, the concepts presented are not limited to that particular portable structure. Mouse device 10 contains standard mouse components such as a mouse ball 24 and mouse buttons 18. An infrared (IR) communications means 26 is added to wireless mouse device 10 as well as a push button 20. These components are discussed further below in connection with FIG. 3.

Figure 3:
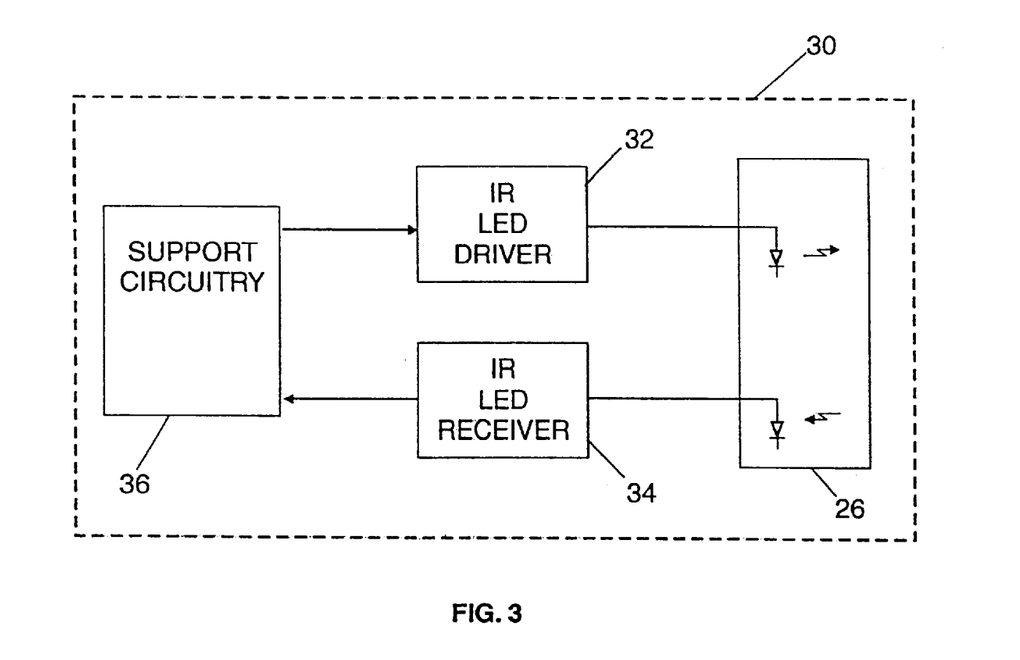
FIG. 3 is a schematic of one embodiment of the electronic implementation of the cableless mouse of the present invention.

FIG. 3 shows the internal electronic circuitry 30 of the mouse device 10. The electronic circuit 30 includes a set of light emitting diodes (LED) 26, an infrared LED driver 32, an infrared LED receiver 34 and wireless communication support circuitry 36. Support circuitry 36 incorporates the lowest hardware level of protocol for the communications, and is described with reference to FIG. 4.

Figure 4:
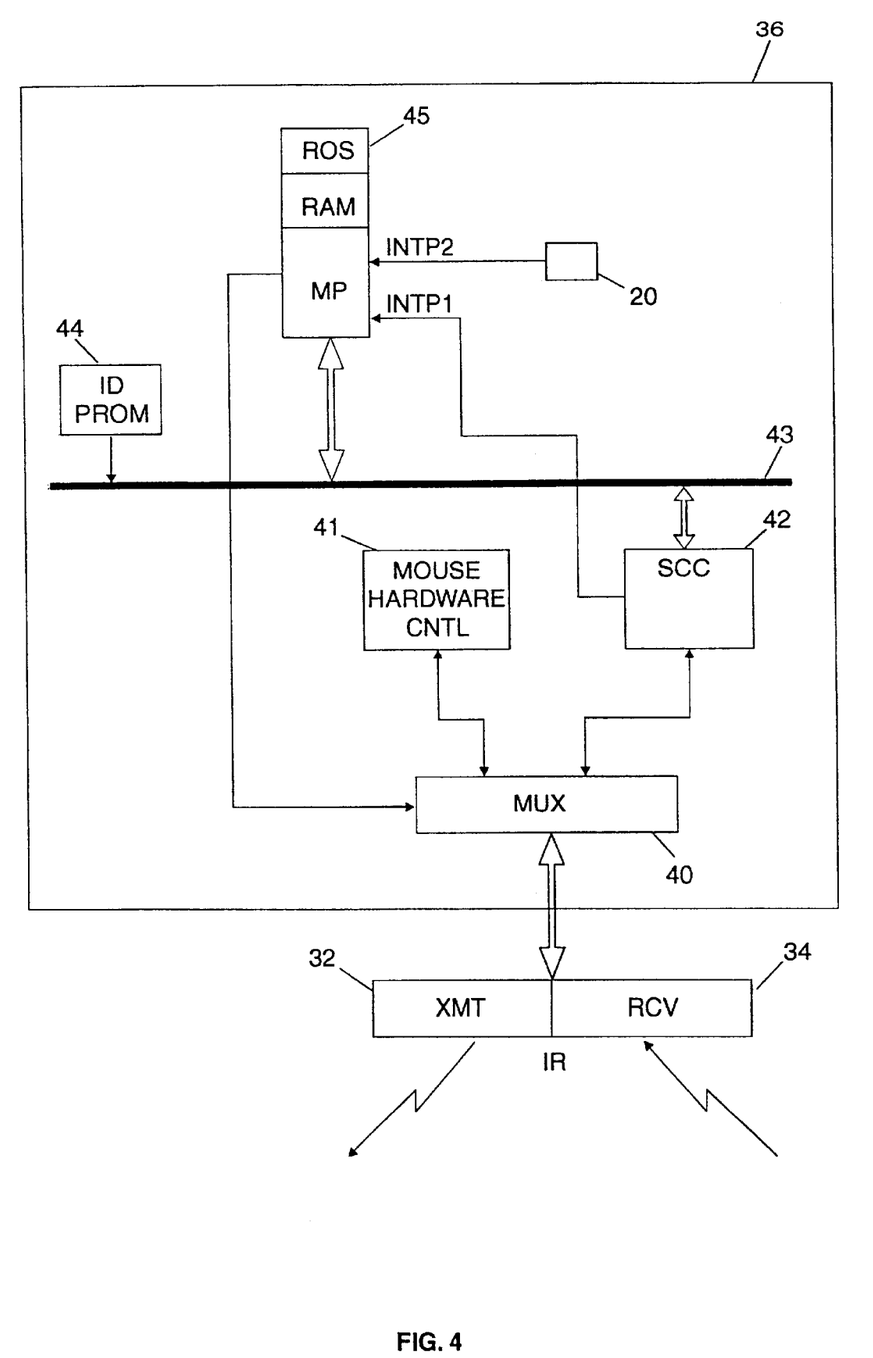
FIG. 4 is a detailed schematic of the support circuit of FIG. 3.

FIG. 4 is a detailed view of the support circuit 36 of FIG. 3. Infrared LED driver 32 and infrared LED receiver 34 are connected to a multiplexer 40. One data input of multiplexer 40 is coupled to a mouse hardware control circuitry 41, the other data input of multiplexer 40 is coupled to a serial communication controller (SCC) 42. The mouse hardware control circuitry 41 is a standard infrared implementation and is not described in detail because it is not part of the present invention. SCC 42 is also connected to a local bus 43 on which is also connected a mouse identification Programmable Read Only Memory (PROM) 44 and a microcontroller 45. A control I/O of microcontroller 45 is connected to the control input of multiplexer 40, microcontroller 45 has two interrupt lines (INTP1, INTP2), the highest priority interrupt line 'INTP 1' is connected to SCC 42, the lowest priority interrupt line 'INTP2' is connected to push button 20. Microcontroller 45 is a standard commercial component including well-known Random Access Memory (RAM) device and Read Only Storage (ROS) device. The ROS device stores the wireless communication program. The mouse identification PROM 44 stores a vendor identification pattern, which allows recognition of the mouse manufacturer, and a device driver of the mouse.

A user willing to work with a desired computer system (PC) must synchronize the mouse to the PC. To do so, the user has to press and hold one predefined key of the PC keyboard while also pressing the push button 20 located on the mouse device 10 as long as the mouse pointer on the display screen stays inactive. When the mouse pointer becomes active, such as having a moving appearance, the user stops pressing both the PC keyboard key and the mouse push button 20. Thereafter, the user works in a usual wireless environment to begin any application on the selected computer system.

The predefined synchronization key on the keyboard, which in the preferred implementation is chosen to be the 'S' key letter, is analyzed by the IR software running in the PC as will be further described with reference to FIG. 9.

The user willing to work with another PC with the same mouse device has to first desynchronize from the active PC and then to begin the synchronization operation with the new selected PC in the way as previously described. To desynchronize, the user must press and hold one predefined key of the PC keyboard while the push button 20 located on the mouse device 10 is pressed as long as the mouse pointer on the display screen is active. This predefined desynchronization key which in the preferred implementation is chosen to be the 'D' key letter is analyzed by the IR software running in the PC as it will be further described with reference to FIG. 9. One skilled in the art will understand that any other predefined keys of a keyboard could be selected for both the synchronization and the desynchronization operations.

Figure 5:
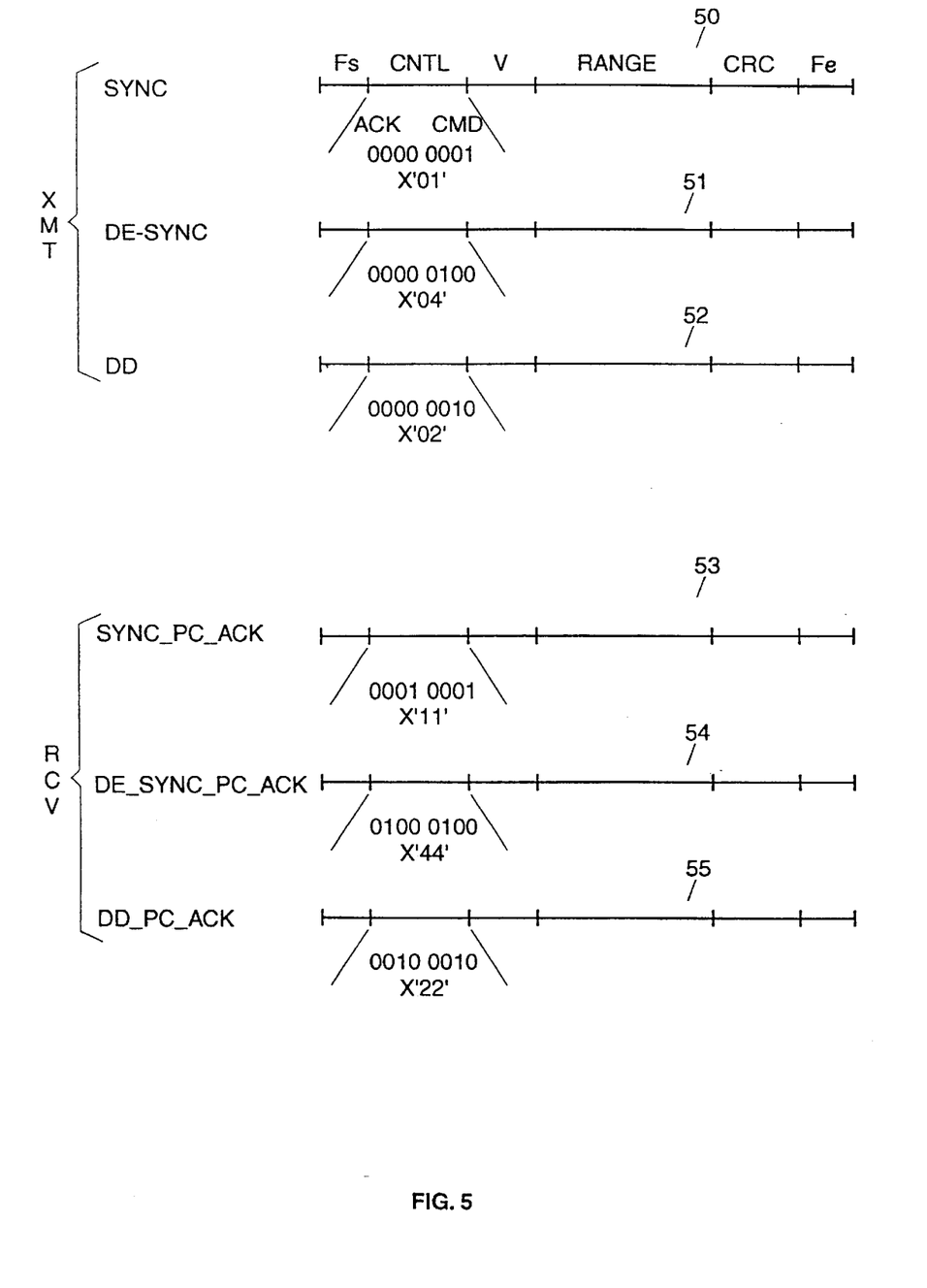
FIG. 5 shows the different formats of the HDLC frames exchanged between the cableless mouse in accordance with the present invention.

Preferably these synchronization and desynchronization operations between the mouse device and the computer system use the well-known HDLC frames, but other protocols could be used without departing from the spirit of the invention FIG. 5 shows the different formats of the HDLC frames exchanged between the mouse in accordance with the present invention and the computer device. On top of FIG. 5, lines 50, 51 and 52 illustrate the HDLC transmit frames (XMT frames) sent by the mouse device 10 to the PCs (16, 16i, 16n). Similarly, the three bottom lines 53, 54 and 55 illustrate the HDLC receive frames (RCV frames) sent by the PCs (16, 16i, 16n) to the mouse device 10.

Generally speaking, the HDLC frames are made of a starting flag (Fs), a control byte (CNTL), data bytes (V, Range), two Cyclic Redundancy Check (CRC) bytes and an ending flag (Fe). The control byte is one feature of the invention that the control byte be characteristic of each frame. It is composed of two parts: the four highest bits are referred to as Acknowledge bits (ACK) and the four lowest bits are referred as Command bits (CMD). The command bits (CMD) are set by the mouse device while the Acknowledge bits (ACK) are set by the PC.

The control byte (CNTL) specifies the type of the transmit and receive frame. In the preferred implementation, three types of frames are defined for each group of three frames, but it is to be understood that a different number of frames could be defined.

For the transmit group, a first transmit frame is referred as the synchronization frame (SYNC). The control byte is set by the mouse device to an hexa pattern 01 (X'01'). For a second transmit frame referred as the desynchronization frame (DE-SYNC), the control byte is set by the mouse device to an hexa pattern 04 (X'04'). For a third transmit frame referred as the device driver frame (DD) the control byte is set by the mouse device to an hexa pattern 02 (X'02').

For the receive group, a first receive frame is referred to as the PC synchronization acknowledgment frame (SYNC-PC-ACK), and the control byte is set by the PC to an hexa pattern 11 (X'11'). For a second receive frame referred as the PC desynchronization acknowledgment frame (DE-SYNC-PC-ACK), the control byte is set by the PC to an hexa pattern 44 (X'44'). For a third receive frame referred as the PC device driver acknowledgment frame (DD-PC-ACK) the control byte is set by the PC to an hexa pattern 22 (X'22').

In the data bytes area, a first byte 'V' defines the vendor identification. This number is defined and given to a vendor by the infrared standard organization. Each vendor has a unique number.

The other data bytes are dependent on the type of the HDLC frames. For the referenced frames 50, 51, 53 and 54, these bytes represent the address of the mouse device which is unique for each mouse device produced by a vendor. In the preferred embodiment, the address is defined by four bytes which is a correct number to address more than four giga different mouses, but the skilled man could easily defined another number of bytes if necessary.

For the referenced frames 52 and 55, these bytes represent the device driver of the mouse device which is downloaded from the mouse device to the PC. The number of bytes depends on the manufacturer device driver development.

Figure 6:
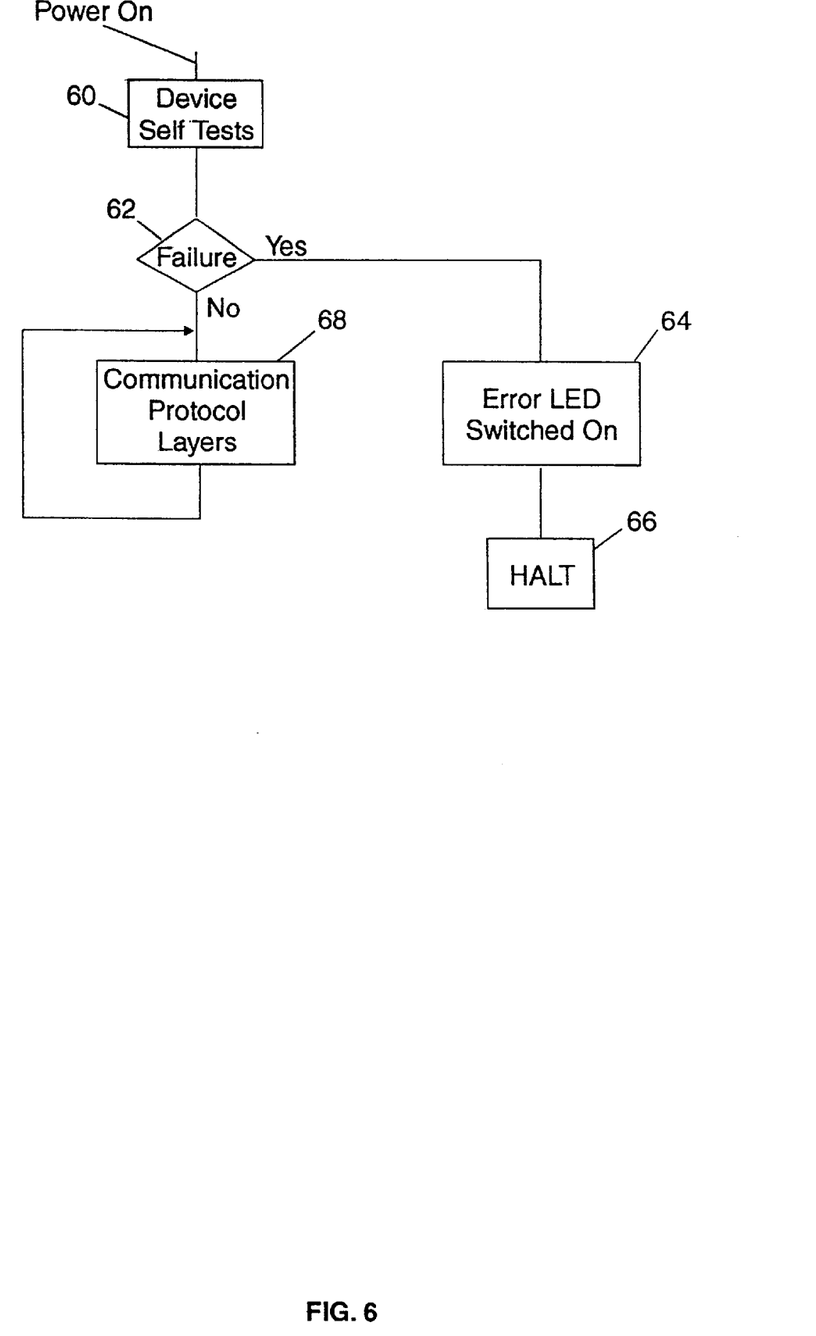
FIG. 6 is a flowchart showing the steps of the mouse device stand-by routine.

As now illustrated by FIG. 6, the mouse device stand-by routine is described. This routine starts running from the mouse power ON by the activation of a power-on switch (not shown on the figures). Microcontroller 45 performs a mouse device self-test at step 60. Next, block 62 tests if any error. In case of failure (branch YES) a visuable error LED (not shown on the figures) is switched ON at step 64 and Microcontroller 45 stops at step 66. In case there is no failure at the test device (branch NO), Microcontroller 45 executes the common communication protocol layers on step 68. Any event such as a user action on push button 20 or status reception from serial communication controller 42 generates an interruption of the stand-by routine to enter the respective event process.

Coming from reset, the mouse device is in IDLE state. When the user presses the push button 20, Microcontroller 45 executes the steps of the interrupt routine associated to the synchronization/desynchronization push button as shown on FIG. 7. On block 700, the multiplexer is set to a port B which means that SCC 42 is connected to the infrared interface. On block 701, a software variable called 'SYNC-MODE' is tested active. Because the previous state of the mouse device is IDLE, the variable 'SYNC-MODE' is not active and the routine goes to block 702 where a synchronization frame 50 is sent. On next block 704, processing holds for a predefined time interval. During this time interval, a serial communication controller interrupt routine is executed as will be further described in details with reference to FIG. 8.

Figure 7:
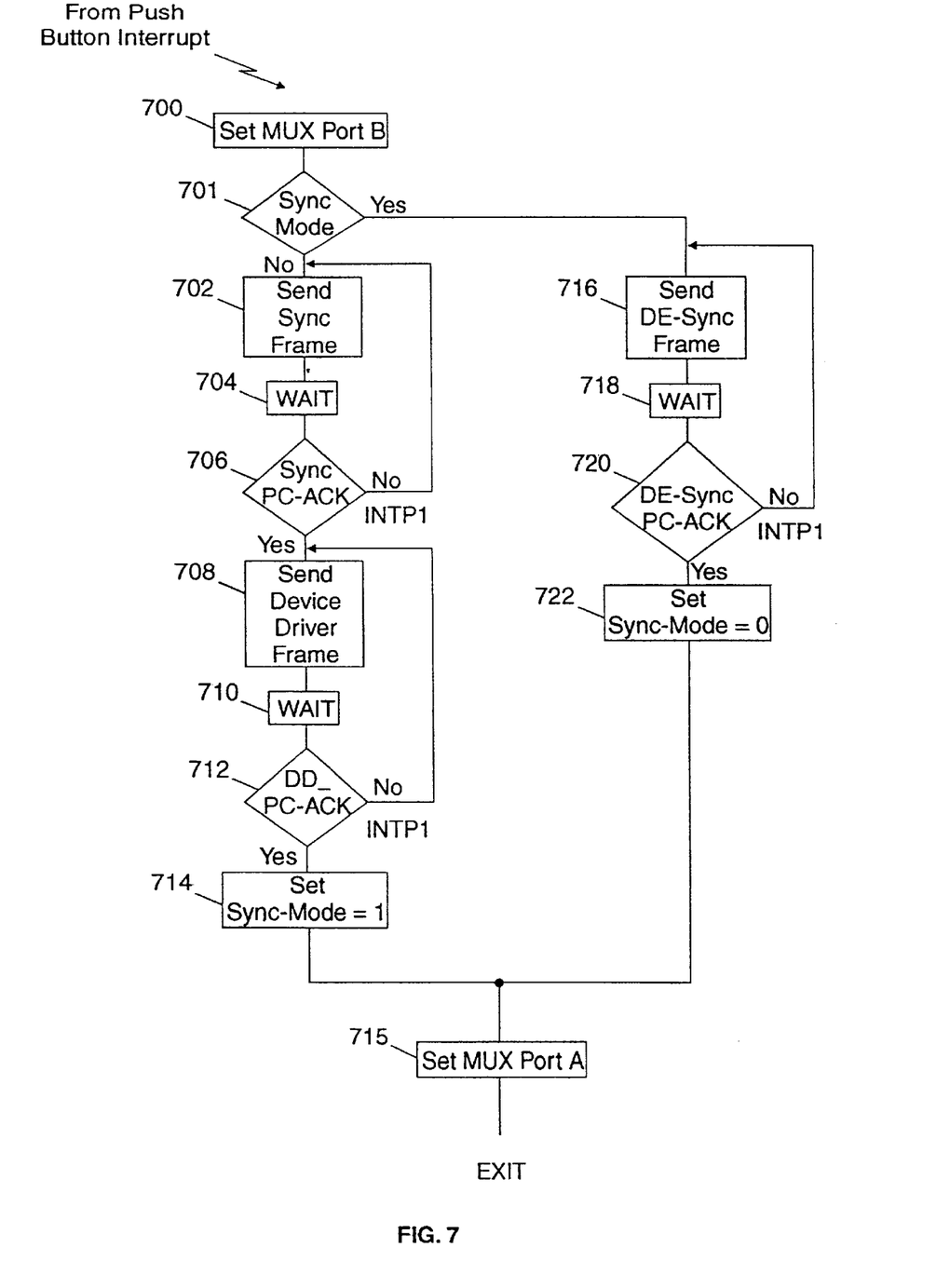
FIG. 7 is a flowchart showing the steps of the interrupt routine associated to the synchronization/desynchronization push button.

At the end of the time interval, the 'SYNC-PC-ACK' software variable is tested to be active on block 706. If the variable is not active, which means that the interrogated PC is not yet responding to the mouse request, then the routine loops to block 702 where a frame (50) is sent again.

If the variable is active, the process goes to block 708 where the device driver frame (52) is sent to the responding PC.

On next block 710, processing holds for a predefined time interval. At the end of the time interval, the 'DD-PC-ACK' software variable is tested to be active on block 712. If the variable is not active then the routine loops to block 708, where frame 52 is sent again.

If the variable is active (branch YES), the process goes to block 714 where the software variable SYNC-MODE is set active. On block 715, the multiplexer is set back to port A which means that the mouse hardware control is connected to the infrared interface and the process exit the routine.

Coming back to block 701, when the SYNC-MODE variable is active, the process goes to block 716, where the desynchronization frame 51 is sent. On next block 718, processing holds for a predefined time interval. At the end of the time interval, the 'DE-SYNC-PC-ACK' software variable is tested to be active on block 720. If the variable is not active, then the routine loops to block 716 until the active PC sends an active 'DE-SYNC-PC-ACK' frame. In this case (branch YES of block 720), the process goes to block 722 where the software variable SYNC-MODE is set inactive. On block 715, the multiplexer is set back to a port A which means that the mouse hardware control 41 is connected to the infrared interface and the synchronization process exit the routine.

Figure 8:
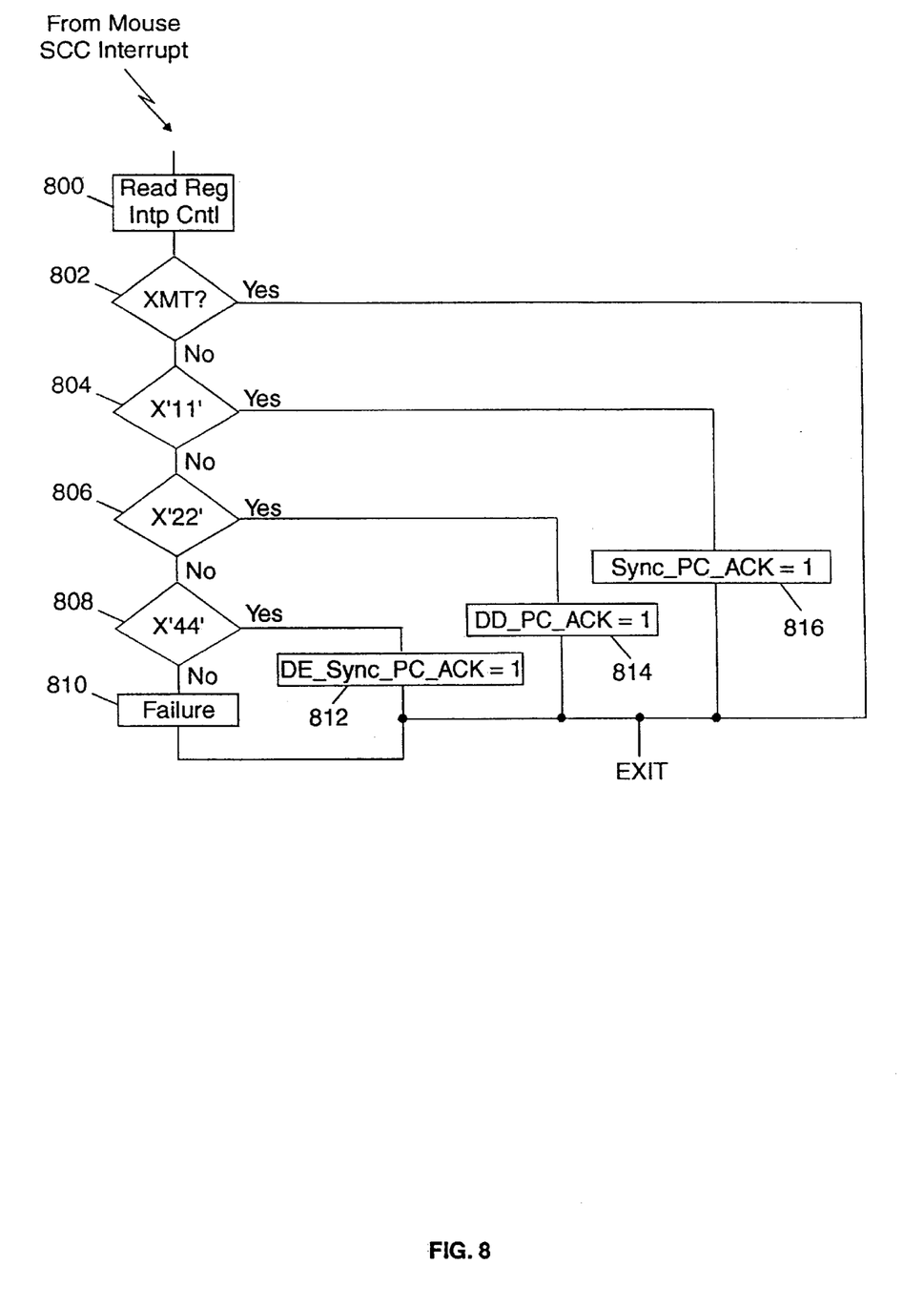
FIG. 8 is a flowchart showing the steps of the mouse serial communication controller interrupt routine.

FIG. 8 is a flowchart showing the steps of interrupt routine of the serial communication controller 42 located in the mouse device. This process is executed each time the serial communication controller transmits or receives a frame. On block 800, Microcontroller 45 reads the content of an interrupt control register. Block 802 determines the source of the interrupt signal (INTP1). On branch YES, the source interruption is an end of transmission and the process exits the routine. On branch NO, the source of the interruption corresponds to the reception of a frame sent by a PC, and the process goes on with step 804 which checks if the reception is a frame of the type PC synchronization acknowledgment (53). If YES, the process goes to step 816 where the software variable SYNC-PC-ACK is set active and the process exits the routine. If NO, the process goes to step 806 which checks if the reception is a frame of the type PC device driver acknowledgment (55). If YES, the process goes to step 814 where the software variable DD-PC-ACK is set active and the process exits the routine. If NO, the process goes to step 808 which checks if the reception is a frame of the type PC desynchronization acknowledgment (54). If YES, the process goes to step 812 where the software variable DE-SYNC-PC-ACK is set active and the process exits the routine. If NO, the process goes to step 810 which handles an erroneous received frame and then the process exits the routine.

It is to be noted that steps 804, 806 and 808 could be operated in another sequence without changing the functionality of the routine.

Figure 9A:
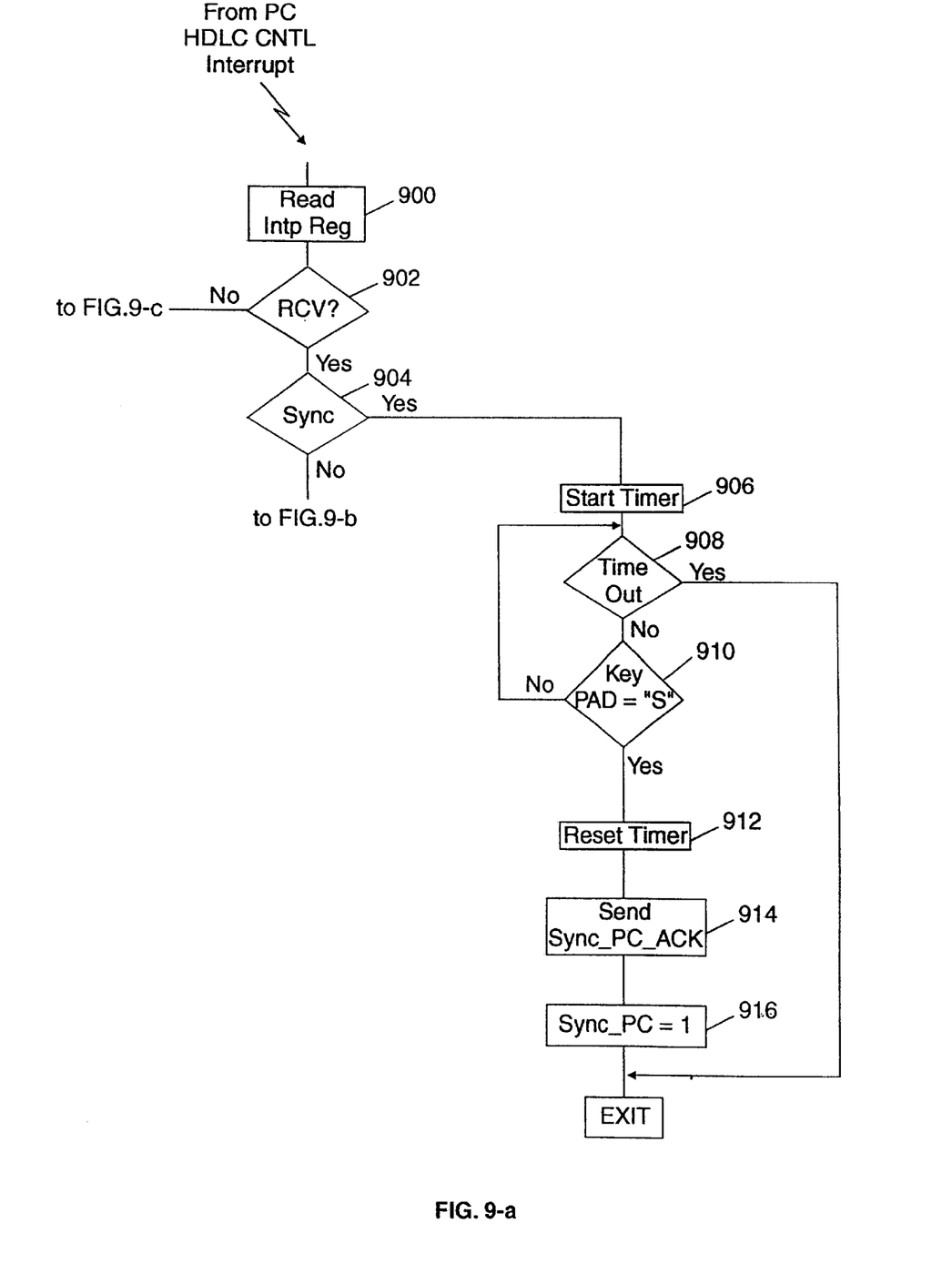
FIGS. 9a, 9b, and 9c show flowcharts of the steps of the infrared PC serial communication controller interrupt routine.
Figure 9B:
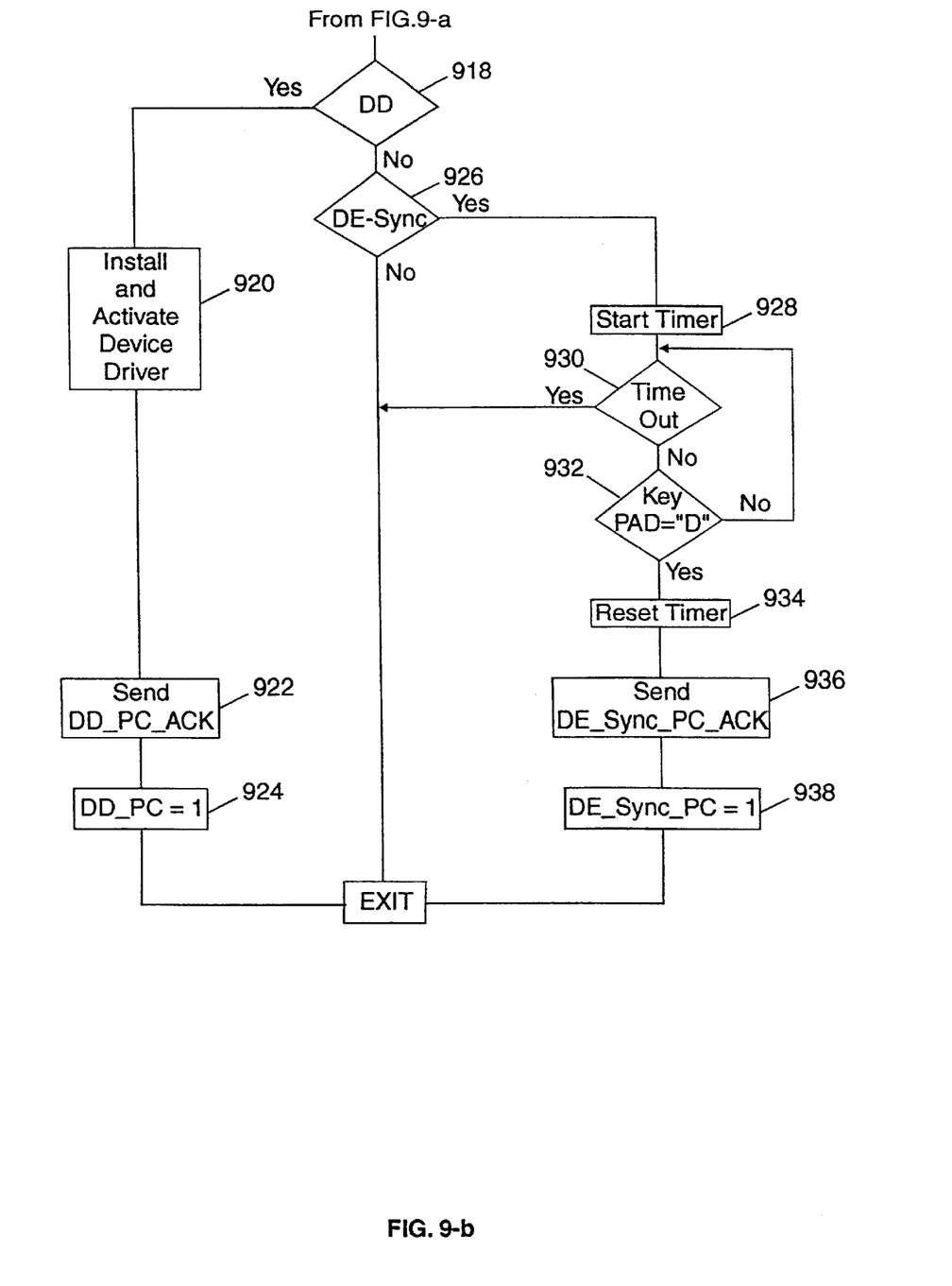
Figure 9C:
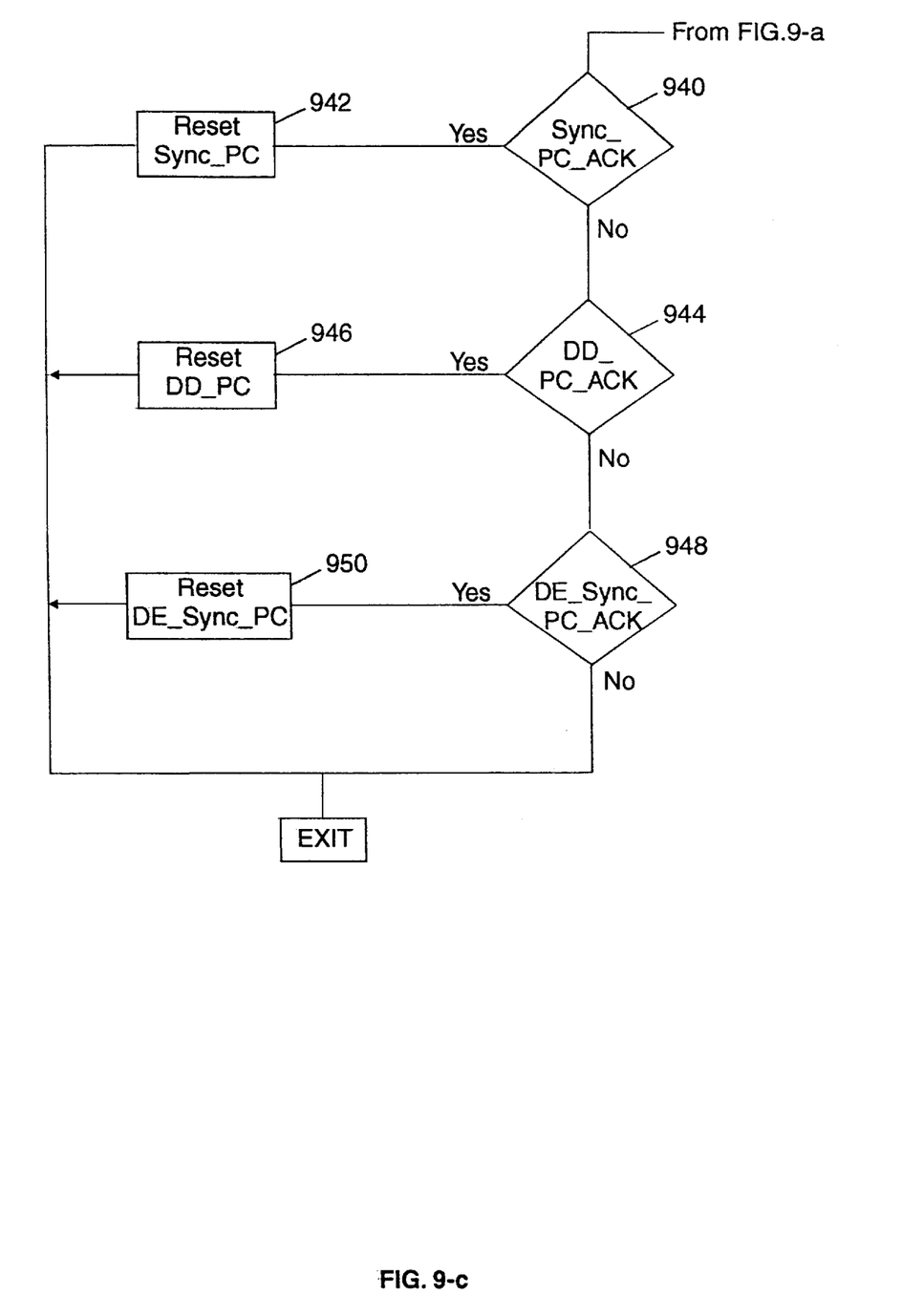

FIGS. 9a, 9b and 9c depict one embodiment of an interrupt routine flowchart of the infrared PC serial communication controller in accordance with the present invention. This process is executed each time the PC serial communication controller transmits or receives a frame.

On block 900 of FIG. 9a, the processor of the PC reads the interrupt control register to determine the source of the interrupt signal. Branch Yes of block 902 determines a receive interruption while branch NO determines a transmit interruption. From branch YES, the process goes to step 904 to check if a synchronization frame of the type 50 has been received from the mouse device. If YES, a timer is initialized on block 906 to allow the PCs which are not selected to exit the routine when the timer elapses. Next, according to a time out decision block 908, the process either exits the routine (branch YES) or jumps to block 910 which checks a keyboard input from the user. If the user presses the 'S' key, then the process goes to step 912 otherwise the process loops to step 908. It should be noted at this stage that the user must enter the 'S' key to synchronize the device mouse with the selected computer system. On block 912, the timer is reset, and the PC serial communication controller sends the PC synchronization acknowledgment frame (53) to the mouse device on block 914. Next, a software variable PC synchronization (SYNC-PC) is set on block 916, and finally, the routine ends.

Going back to step 904, with reference to FIG. 9*b*, if the received frame is not a synchronization frame, block 918 checks if the frame is a device driver frame (52). If YES, the process installs and activates the received device driver on step 920. The PC serial communication controller sends on block 922 the PC device driver acknowledgment frame (55) to the mouse device. Next, a software variable PC device driver (DD-PC) is set on block 924, and finally, the routine ends.

Going back to step 918, if the received frame is not a device driver frame, block 926 checks if the frame is a desynchronization frame (51). If YES, a timer is initialized on block 928 to allow the PCs which are not selected to exit the routine when the timer elapses. Next, according to a time out decision block 930, the process either exits the routine (branch YES) or jumps to block 932 which checks a keyboard input from the user. If the user presses the 'D' key, then the process goes to step 934 otherwise the process loops to step 930. It should be noted at this stage that the user must enter the 'D' key to desynchronize the device mouse with the selected computer system. On block 934, the timer is reset, and the PC serial communication controller sends the PC desynchronization acknowledgment frame (54) to the mouse device on block 936. Next, a software variable PC desynchronization (DE-SYNC-PC) is set on block 938, and finally, the routine ends.

Going back to step 926, if the received frame is not a desynchronization frame (branch NO), the routine ends and the system enters the common wireless communication protocol for reception as previously defined on block 68 of FIG. 6.

Going back again to block 902 with reference to FIG. 9-*c*, branch NO determines a transmit interruption. The process goes to step 940 to check if the PC synchronization acknowledgment frame of the type 53 has been sent to the mouse device. If YES, the software variable SYNC-PC is reset at step 942 and the routine ends. If NO, the process goes to step 944 to check if the PC device driver acknowledgment frame of the type 55 has been sent to the mouse device. If YES, the software variable DD-PC is reset at step 946 and the routine ends. If NO, the process goes to step 948 to check if the PC desynchronization acknowledgment frame of the type 54 has been sent to the mouse device. If YES, the software variable DE-SYNC-PC is reset at step 950 and the routine ends. If NO, the routine ends and the system enters the common wireless communication protocol for transmission as previously defined on block 68 of FIG. 6.

Although specific embodiments of the present invention have been illustrated in the accompanying drawings and described in the foregoing detailed description, it will be understood that the invention is not limited to the particular embodiments described herein, but is capable of numerous rearrangements, modifications and substitutions without departing from the scope of the invention. The following claims are intended to encompass all such modifications.

What is claimed is:

1. A computer system capable of coupling to a wireless peripheral device, the computer system comprising:

a first actuation means on a wireless peripheral device, the first actuation means enabling a transmission of an identifier signal that identifies a request for a wireless communication initialization between the wireless peripheral device and a computer; and a second actuation means on the computer, the second actuation means enabling a transmission of an acknowledgment signal, the acknowledgment signal acknowledging an initialization of a wireless coupling between the wireless peripheral device and the computer in response to the identifier signal, wherein the initialization of the wireless coupling is effected only when the first and second actuation means are simultaneously engaged by one or more users.

2. The computer system of claim 1, wherein a device driver for the wireless peripheral device is stored in the computer, and the device driver is identified by the identifier signal.

3. The computer system of claim 1, wherein a device driver for the wireless peripheral device is transmitted from the wireless peripheral device to the computer.

4. The computer system of claim 1, further comprising:

a third actuation means an the computer, wherein the third actuation means enables a transmission from the computer of a disengagement signal when the third actuation means and the first actuation means are simultaneously engaged by one or more users, the disengagement signal acknowledging a disengagement of the wireless coupling between the wireless peripheral device and the computer in response to the computer performing the disengagement.

5. The computer system of claim 1, further comprising:

an error light on the wireless peripheral device, the error light illuminating when an internal self-test of the wireless peripheral device fails.

6. The computer system of claim 1, wherein the identifier signal is in a format using High-level Data Link Control (HDLC) frames.

7. The computer system of claim 1, wherein the wireless peripheral device is a mouse.

8. A wireless peripheral device capable of coupling to a computer system, the wireless peripheral device comprising:

a first actuation means, the first actuation means enabling a transmission of an identifier signal that identifies a request for a wireless communication initialization between the wireless peripheral device and a computer, and a synchronization signal receiving means, the synchronization signal receiving means being capable of receiving an acknowledgment signal from the computer, the acknowledgment signal acknowledging a synchronization of a wireless coupling between the wireless peripheral device and the computer in response to the identifier signal when the first actuation means on the wireless peripheral device and a second actuation means on the computer are simultaneously engaged by one or more users.

9. The wireless peripheral device of claim 8, wherein a device driver for the wireless peripheral device is stored in the computer, and the device driver is identified by the identifier signal.

10. The wireless peripheral device of claim 8, wherein a device driver for the wireless peripheral device is transmitted from the wireless peripheral device to the computer.

11. The wireless peripheral device of claim 8, further comprising:

a visual error light that illuminates if the wireless peripheral device fails an internal self-test.

12. The wireless peripheral device of claim 8, wherein the identifier signal is in a format using High-level Data Link Control (HDLC) frames.

13. The wireless peripheral device of claim 8, wherein the wireless peripheral device is a mouse.

14. A method for coupling a wireless peripheral device to a computer, the method comprising:

> transmitting from a wireless peripheral device an identifier signal that identifies a request for a wireless communication initialization between the wireless peripheral device and a computer;
>
> transmitting of an acknowledgment signal from the computer, the acknowledgment signal acknowledging an initialization of a wireless coupling between the wireless peripheral device and the computer in response to the identifier signal; and
>
> detecting if a first actuation means on the wireless peripheral device for transmitting the identifier signal and a second actuation means on the computer for transmitting the acknowledgment signal are simultaneously engaged, wherein the initialization of the wireless coupling is effected only when a first and second actuation means are simultaneously engaged by one or more users.

15. The method of claim 14, wherein a device driver for the wireless peripheral device is stored in the computer, and the device driver is identified by the identifier signal.

16. The method of claim 14, wherein a device driver for the wireless peripheral device is transmitted from the wireless peripheral device to the computer.

17. The method of claim 14, comprising:

> transmitting a disengagement signal from the computer by engaging a third actuation means on the computer simultaneously with an engagement of the first actuation means, wherein the simultaneous engagement of the first and third actuation means by one or more users enables a transmission of a disengagement signal, the disengagement signal acknowledging a disengagement of the wireless coupling between the wireless peripheral device and the computer in response to the computer performing the disengagement.

18. The method of claim 14, further comprising:

> illuminating an error light on the wireless peripheral device when the wireless peripheral device fails an internal self-test.

19. The method of claim 14, wherein the identifier signal is in a format using High-level Data Link Control (HDLC) frames.

20. The method of claim 14, wherein the wireless peripheral device is a mouse.

* * * * *